United States Patent
Chen et al.

(10) Patent No.: US 11,175,770 B2
(45) Date of Patent: Nov. 16, 2021

(54) TOUCH DEVICE WITH CHARGING FUNCTION AND CHARGING CONTROL METHOD THEREOF

(71) Applicant: ELAN MICROELECTRONICS CORPORATION, Hsinchu (TW)

(72) Inventors: Han-Wei Chen, Taipei (TW); Hsuan-Wen Tseng, New Taipei (TW); Yi-Hsin Tao, Hsinchu (TW); Chia-Hsing Lin, Hsinchu (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/600,922

(22) Filed: Oct. 14, 2019

(65) Prior Publication Data

US 2020/0133428 A1 Apr. 30, 2020

Related U.S. Application Data

(60) Provisional application No. 62/750,192, filed on Oct. 24, 2018.

(30) Foreign Application Priority Data

Sep. 11, 2019 (TW) .................................. 108132663

(51) Int. Cl.
*G06F 3/044* (2006.01)
*G06F 3/047* (2006.01)
(Continued)

(52) U.S. Cl.
CPC ............ *G06F 3/0416* (2013.01); *G06F 3/041* (2013.01); *G06F 3/044* (2013.01); *G06F 3/046* (2013.01);
(Continued)

(58) Field of Classification Search
CPC .. G06F 3/0488; G06F 3/03545; G06F 3/0412; G06F 3/0416; G06F 3/046;
(Continued)

(56) References Cited

U.S. PATENT DOCUMENTS 5,225,637 A * 7/1993 Rodgers ................... G06F 3/046
178/19.03
8,933,897 B2 * 1/2015 Liu ........................ G06F 3/0412
345/173

(Continued)

FOREIGN PATENT DOCUMENTS

TW I510977 B 12/2015
TW I537774 B 6/2016

*Primary Examiner* — Dismery Mercedes
(74) *Attorney, Agent, or Firm* — Patenttm.US (57) ABSTRACT

A touch device has multiple charging traces distributed under the touch operation area. When the object hovers over or contacts the touch operation area, the control unit of the touch device obtains the corresponding position of the object through the sensing signal of the electrode units. The control unit in turn connect the charging traces adjacent to the corresponding position of the object to form at least one charging loop. In the process of the touch operation on the touch device, the object can be charged at the same time, and the convenience of use can be improved.

13 Claims, 8 Drawing Sheets

(51) Int. Cl.
*G06F 3/041* (2006.01)
*H02J 7/00* (2006.01)
*G06F 3/046* (2006.01)
*G06F 3/0354* (2013.01)

(52) U.S. Cl.
CPC ............ *G06F 3/047* (2013.01); *G06F 3/0412* (2013.01); *G06F 3/0445* (2019.05); *H02J 7/00* (2013.01); *G06F 3/03545* (2013.01); *G06F 2203/04108* (2013.01)

(58) Field of Classification Search
CPC .... G06F 3/041; G06F 3/0443; G06F 3/04164; G06F 3/047; G06F 3/01; G06F 3/0383; G06F 3/04162; H02J 7/025; H02J 7/007; H02J 50/60; H02J 50/80
See application file for complete search history.

(56) References Cited

U.S. PATENT DOCUMENTS

| | | | | |
|---|---|---|---|---|
| 9,268,427 | B2* | 2/2016 | Yousefpor | G06F 3/04164 |
| 9,619,086 | B2* | 4/2017 | Park | G06F 3/0446 |
| 9,759,579 | B2* | 9/2017 | Liu | G06F 3/0412 |
| 9,846,502 | B2* | 12/2017 | Lee | G06F 3/0412 |
| 10,228,809 | B2* | 3/2019 | Mizuhashi | G06F 3/03545 |
| 10,719,153 | B2* | 7/2020 | Zhang | G06F 3/0445 |
| 2006/0012581 | A1* | 1/2006 | Haim | G06F 3/0446 345/173 |
| 2012/0043140 | A1* | 2/2012 | Peterson | G06F 3/044 178/18.06 |
| 2012/0154326 | A1* | 6/2012 | Liu | G06F 3/0446 345/174 |
| 2013/0063388 | A1* | 3/2013 | Ningrat | G06F 3/0446 345/174 |
| 2013/0076647 | A1* | 3/2013 | Yousefpor | G06F 3/0418 345/173 |
| 2013/0147720 | A1 | 6/2013 | Yilmaz | |
| 2013/0222328 | A1* | 8/2013 | Cok | G06F 3/0445 345/174 |
| 2013/0285973 | A1* | 10/2013 | Elias | G06F 3/041662 345/174 |
| 2014/0306925 | A1* | 10/2014 | Yeh | G06F 3/0446 345/174 |
| 2015/0145810 | A1* | 5/2015 | Shih | G06F 3/04166 345/174 |
| 2015/0220206 | A1* | 8/2015 | Knausz | G06F 3/0446 345/174 |
| 2015/0331504 | A1* | 11/2015 | Chen | G06F 3/04162 345/174 |
| 2016/0334905 | A1* | 11/2016 | Hu | G06F 3/04166 |
| 2016/0370413 | A1* | 12/2016 | Lu | G06F 3/0418 |
| 2016/0370926 | A1* | 12/2016 | Lee | G06F 3/0418 |
| 2017/0060278 | A1* | 3/2017 | Jung | G06F 3/0412 |
| 2017/0123568 | A1* | 5/2017 | Takeda | G06F 3/0441 |
| 2017/0262102 | A1* | 9/2017 | Mizuhashi | G02F 1/13338 |
| 2019/0121473 | A1* | 4/2019 | Zhang | G06F 3/0445 |
| 2019/0384457 | A1* | 12/2019 | Fujiyoshi | H03K 17/962 |
| 2020/0409491 | A1* | 12/2020 | Maharyta | G06F 3/044 |

\* cited by examiner

TOUCH DEVICE WITH CHARGING FUNCTION AND CHARGING CONTROL METHOD THEREOF

CROSS-REFERENCE TO RELATED APPLICATIONS

This application claims the benefit of United States provisional application filed on Oct. 24, 2018 and having application Ser. No. 62/750,192, the entire contents of which are hereby incorporated herein by reference.

This application is based upon and claims priority under 35 U.S.C. 119 from Taiwan Patent Application No. 108132663 filed on Sep. 11, 2019, which is hereby specifically incorporated herein by this reference thereto.

BACKGROUND OF THE INVENTION

1. Field of the Invention

The present invention relates to a touch device, especially to a touch device with charging function and its charging control method.

2. Description of the Prior Arts

For the operation of a touch device, in addition to using a finger as an input device, a stylus is also commonly used as an input device for the touch device. The inactive stylus only sets the conductive material at the tip of the stylus to mimic as a finger and form the sensing capacitance between the finger and the touch device, so it is regarded as the extension of the finger, which is similar to the user's operation experience with the finger. In addition, there is an active stylus that can transmit signals to the touch device, which is the mainstream of the current development. The active stylus itself needs to transmit a signal to the touch device to inform the touch device of the position of the active stylus and the related touch information. Therefore, the active stylus needs to have a power supply source to perform signal transmission and the like. In the prior art, a battery is provided in the active stylus for power supply. Users need to pay attention to the power of the active stylus from time to time to avoid the situation that the remaining power is insufficient when they want to use it. For the users, there is indeed inconvenience.

SUMMARY OF THE INVENTION

To overcome the shortcomings, the present invention provides an additional charging method for the input device, so that the user can charge the input device unconsciously during use without paying attention to the power of the input device.

To achieve the objectives, the present invention provides a touch device comprising a touch operation area, a first sensor layer, multiple charging traces, a multiplex unit and a control unit. The first sensor layer has multiple first electrode units arranged under the touch operation area. The charging traces are correspondingly arranged to the touch operation area. The multiplex unit connects to the charging traces. The control unit electrically connects to the multiplex unit. The control unit detects a position of an object via the first electrode units. The multiplex unit electrically connecting several of the charging traces adjacent to the object based on the position of the object to form at least one charging loop.

In another aspect, the present invention also provides a charging control method for a touch device with a charging function, wherein the touch device comprises a touch operation area, multiple charging traces and a control unit, the charging traces are correspondingly arranged to the touch operation area, the control unit connecting to the charging traces and the control method comprises steps of:

determining a position of an object hovering over or contacting the touch operation area by the control unit; and forming at least one charging loop by connecting several of the charging traces near the object.

Other objectives, advantages and novel features of the invention will become more apparent from the following detailed description when taken in conjunction with the accompanying drawings.

DETAILED DESCRIPTION OF THE EMBODIMENTS

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios can be selectively designed and disposed and the detail component layouts may be more complicated.

A touch device with charging function in accordance with the present invention comprises a touch operation area, at least one sensor layer, multiple charging traces, at least one multiplex unit and a control unit. The sensor layer and the charging traces are disposed under the touch operation area. The sensor layer comprises multiple electrode units. The multiplex unit electrically connects to the charging traces. The control unit electrically connects to the electrode units and the multiplex unit. The touch device in accordance with the present invention has various embodiments, and those embodiments are described below along with the drawings but are not limited thereto.

Figure 1:
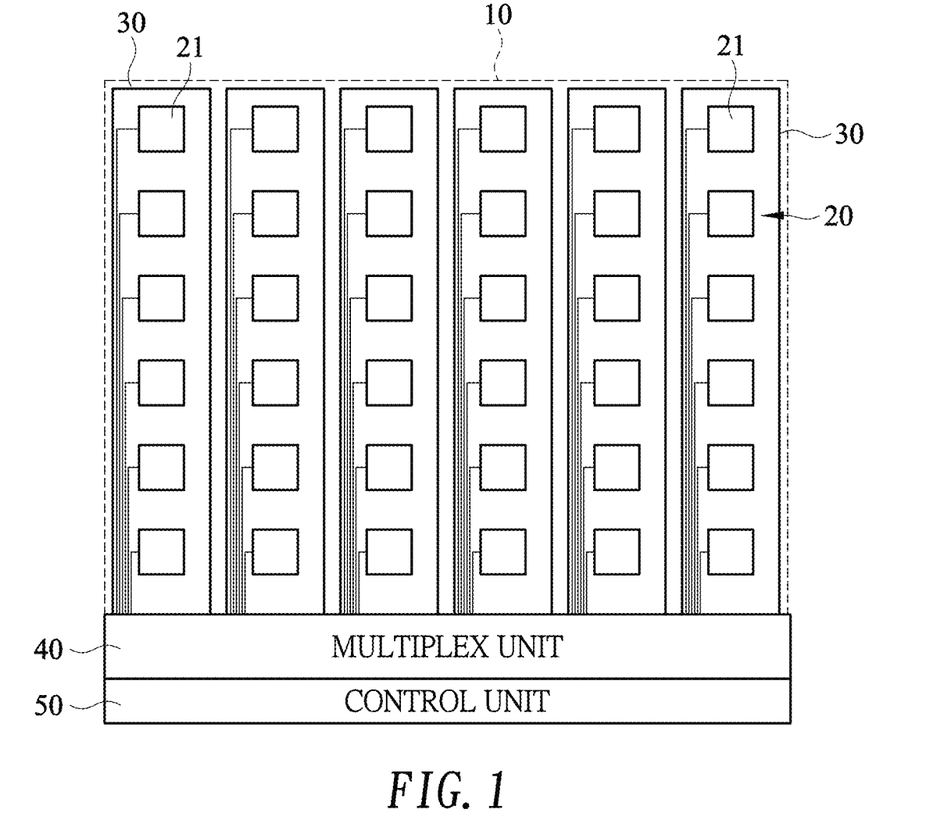
FIG. 1 is an illustrative top view of the internal structure of a first embodiment of a touch device in accordance with the present invention.
Figure 2:
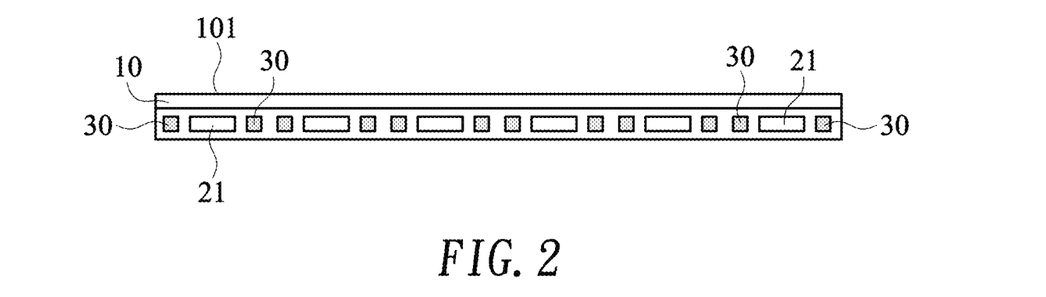
FIG. 2 is an illustrative side view of the internal structure of the touch device in FIG. 1.

With reference to FIGS. 1 and 2, a first embodiment of the touch device comprises a touch operation area 101, a sensor layer 20, multiple charging traces 30, a multiplex unit 40 and a control unit 50. A cover 10 is disposed on the sensor layer 20. Multiple electrode units 21 of the sensor layer 20 and the charging traces 30 are disposed under the touch operation area 101. The sensor layer 20 and the charging trace 30 of this embodiment are located in the same layer. The electrode units 21 are arranged in multiple rows. Each of the charging traces 30 surrounds two long sides and a short side of the electrode units 21 of each row. Both ends of each of the charging traces 30 are connected to the multiplex unit 40. The control unit 50 electrically connects respectively to the electrode units 21 and the multiplex unit 40. The control unit 50 detects the position of an object hovering over or contacting the touch operation area 101 through self-capacitance sensing of the electrode units 21. The control unit 50 controls at least some of the charging traces 30 to conduct through the multiplex unit 40 to form at least one charging loop to charge the object hovering over or contacting the touch operating area 101.

Figure 3:
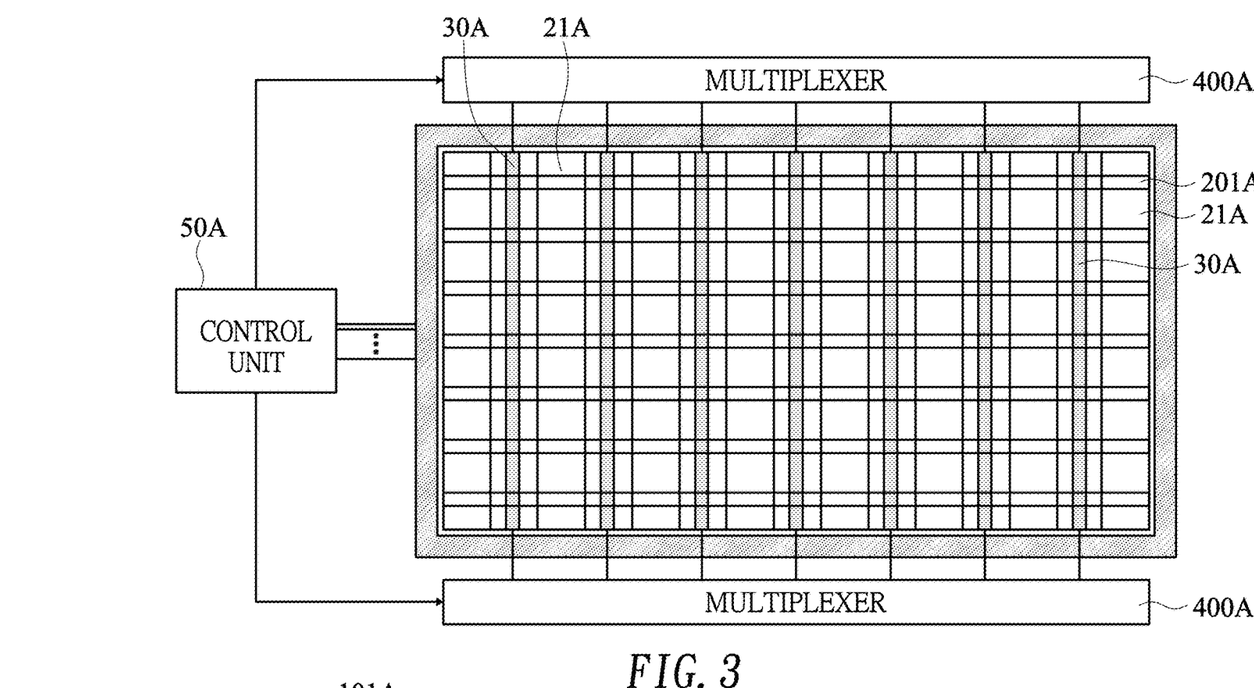
FIG. 3 is an illustrative top view of the internal structure of a second embodiment of a touch device in accordance with the present invention.
Figure 4:
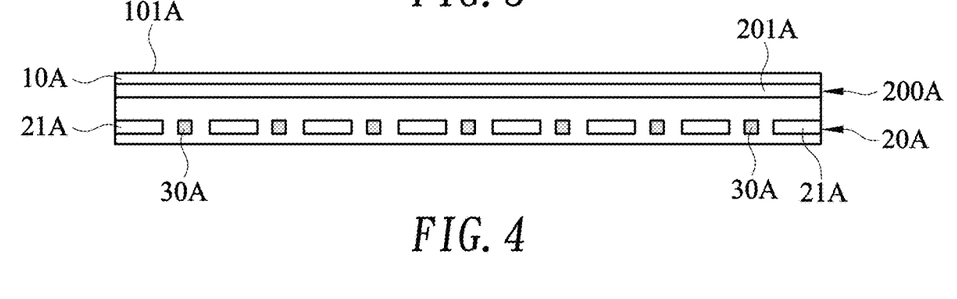
FIG. 4 is an illustrative side view of the internal structure of the touch device in FIG. 3.

With reference to FIGS. 3 and 4, a second embodiment of the touch device comprises a touch operation area 101A, a first sensor layer 20A, a second sensor layer 200A, multiple charging traces 30A, a multiplex unit and a control unit 50A. A cover 10A is disposed on the second sensor layer 200A. Multiple first electrode units 21A of the first sensor layer 20A, multiple second electrode units 201A of the second sensor layer 200A, and the charging traces 30A are disposed under the touch operation area 101A. The first sensor layer 20A and the charging traces 30A are located in the same layer, and the second sensor layer 200A is located at a different layer from the charging traces 30A. Each of the first electrode units 21A serves as a driving electrode unit, and each of the second electrode units 201A serves as a sensing electrode unit. The first electrode units 21A and the second electrode units 201A are arranged in different directions. Each of the charging traces 30A is disposed in a gap between the two adjacent first electrode units 21A, and the charging traces 30A and the adjacent first electrode units 21A are electrically insulated from each other. The multiplex unit of this embodiment includes two multiplexers 400A. One end of each of the charging traces 30A electrically connects to one of the multiplexers 400A, and the other end of each of the charging traces 30A electrically connects to the other multiplexer 400A. The control unit 50A electrically connects respectively to the first electrode units 21A, the second electrode units 201A and the multiplexers 400A. The control unit 50A detects the position of an object hovering over or contacting the touch operation area 101A through the mutual capacitance sensing of the first electrode units 21A and the second electrode units 201A. The control unit 50A controls at least some of the charging traces 30A through the multiplexers 400A to conduct at least one charging loop to charge the object hovering over or contacting the touch operating area 101A.

Figure 5:
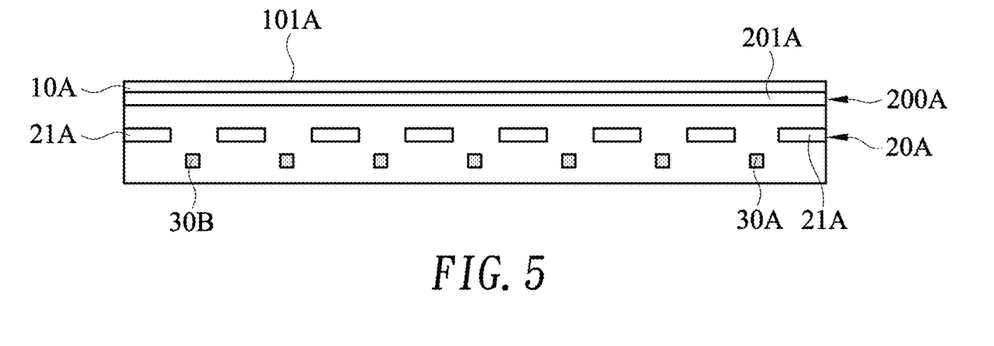
FIG. 5 is an illustrative side view of the internal structure of a third embodiment of a touch device in accordance with the present invention.

With further reference to FIG. 5, a third embodiment of the touch device is similar to the second embodiment shown in FIGS. 3 and 4, but the charging traces 30A are disposed at a different layer from the first sensor layer 20A and the second electrode units 201A. For example, the charging traces 30A are disposed under the first sensor layer 20A.

Figure 6:
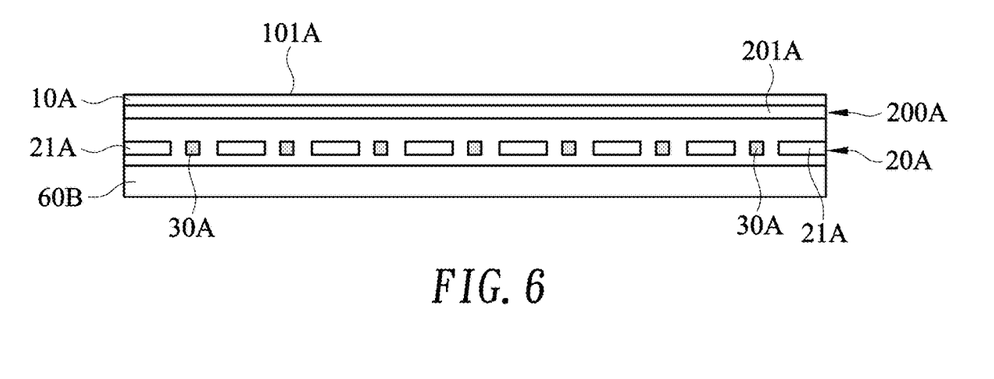
FIG. 6 is an illustrative side view of the internal structure of a fourth embodiment of a touch device in accordance with the present invention.

With further reference to FIG. 6, a fourth embodiment of the touch device is similar to the second embodiment shown in FIGS. 3 and 4, and further comprises a display unit 60B. A common electrode layer of the display unit 60B simultaneously serves as the first sensor layer 20A. The touch device is a touch device having a display function.

In the foregoing embodiments, the first sensor layer may be disposed above the second sensor layer, or the second sensor layer is disposed above the first sensor layer. The common electrode layer of the display unit can be selected as the first sensor layer (driving electrode unit) or the second sensor layer (sampling electrode unit) according to requirements. The charging traces may also be in the same layer with the first sensor layer or the second sensor layer, or the charging traces may be located in a different layer from the first sensor layer and the second sensor layer. When the charging traces, the first sensor layer and the second sensor layer are in different layers, the arrangement between the charging traces and the first sensor layer or the second sensor layer does not completely overlap each other. Furthermore, the width of each charging trace can be smaller than the width of each electrode unit located in the same layer, so that the electrode units in the same layer can maintain a sufficient width to generate a sufficient amount of capacitance changes. Each charging trace has an impedance of less than 500 ohms.

Figure 7:
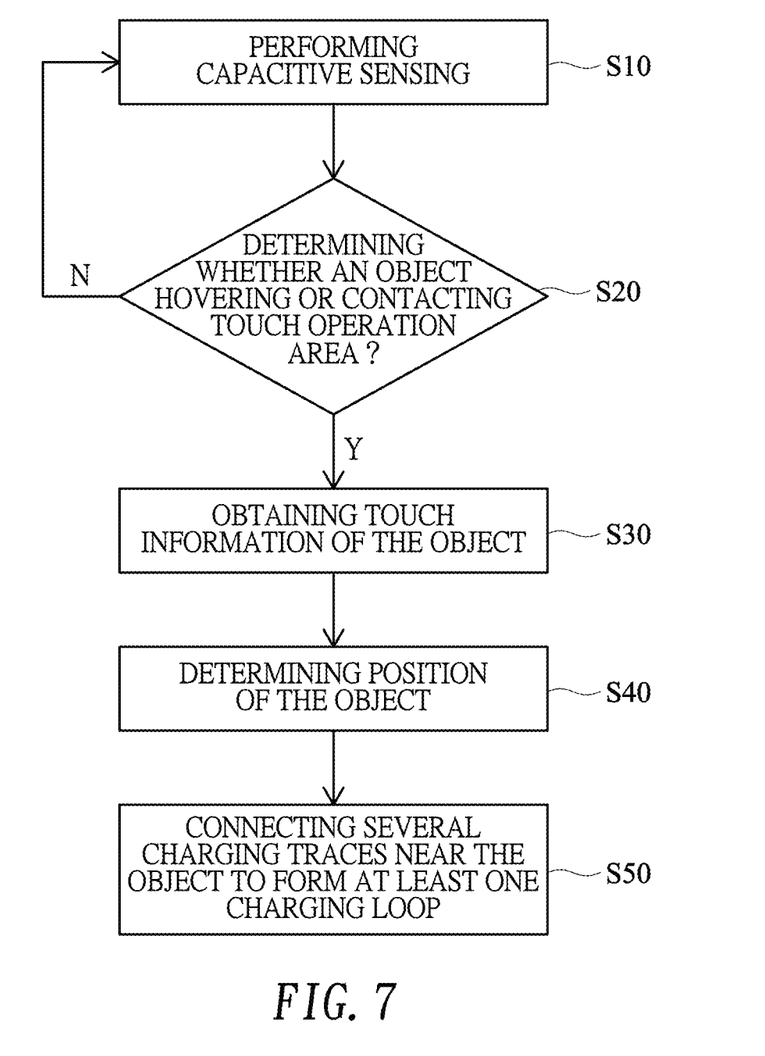
FIG. 7 is a flow chart of a charging control method in accordance with the present invention.

With reference to FIG. 7, the charging control method in accordance with the present invention comprises the following steps: performing capacitive sensing via the sensor layer (S10); determining whether an object hovering over or contacting the touch operation area (S20); if not, then continuing the capacitive sensing of step S10; if there is an object hovering over or contacting the touch operation area, using the capacitance sensed by the sensor layer to obtain touch information corresponding to the object (S30); then determining a position of the object based on the touch information by the control unit (S40); and then according to the position of the object, determining to electrically connect several of the charging traces adjacent to the object to form at least one charging loop to charge the object (S50).

The embodiments of the charging control method in accordance with the present invention are described below with FIGS. 8 to 10 and with the structure of the third embodiment of the touch device as shown in FIGS. 3 and 4. The object 70 shown in the figure is exemplified by a stylus, but is not limited thereto.

When the object 70 hovers over or contacts the touch operation area 101A, the first electrode units 21A of the first sensor layer 20A and the second electrode units 201A of the second sensor layer 200A have capacitance changes at a position corresponding to the object 70. When the control unit 50A obtains the capacitance changes of the first sensor layer 20A and the second sensor layer 200A, the control unit 50A can thereby determine the position corresponding to the object 70. Then, according to the position corresponding to the object 70, the control unit 50A electrically connects several of the charging traces 30A near the position of the object 70 through the multiplexer 400A to form a charging loop to charge the object 70. The more charging traces 30A that are electrically connected, the higher the charging power provided, and vice versa. The closer the object 70 is to the charging trace 30A, the higher the charging efficiency that can be achieved, and vice versa.

Figure 8:
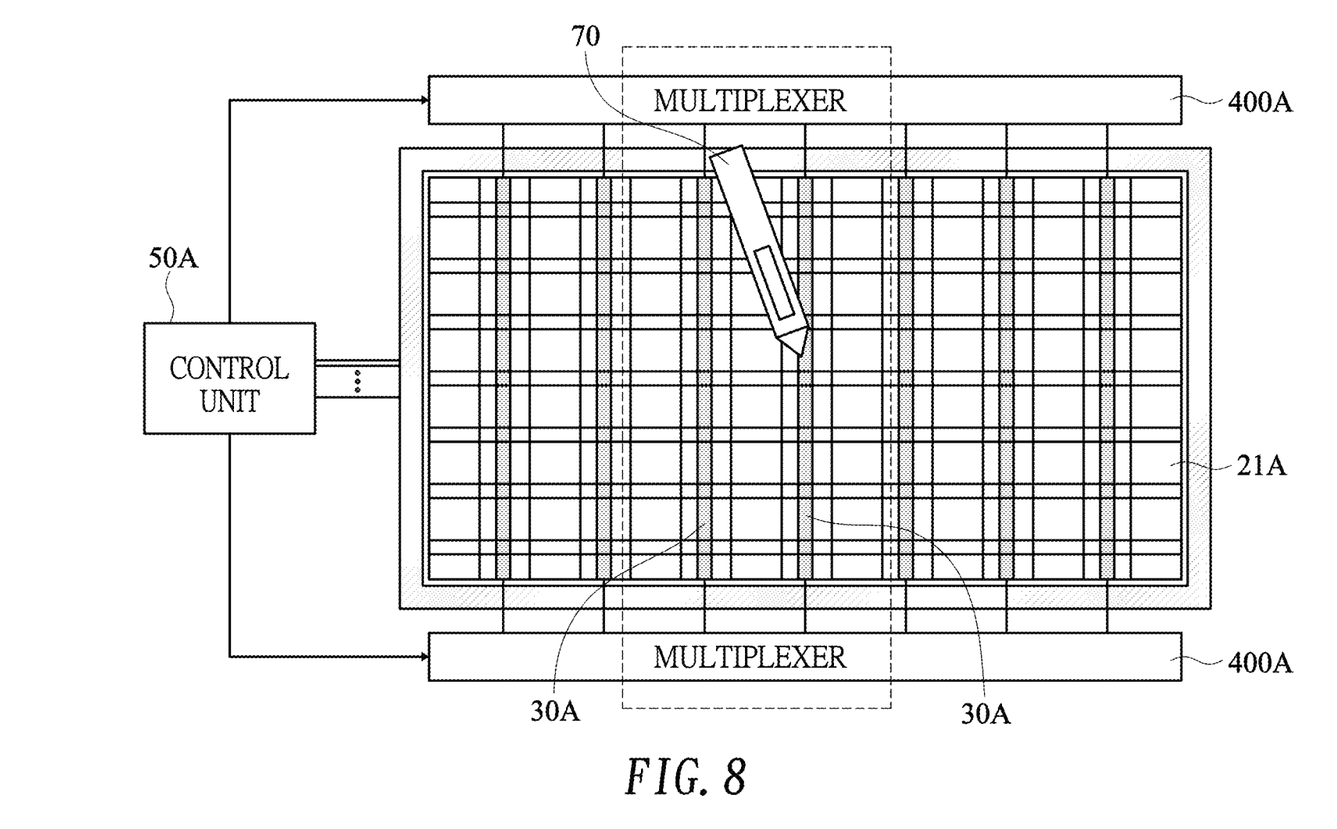
FIG. 8 is an operational illustrative top view of the touch device in FIG. 3, showing the stylus hovering over or contacting the touch device.
Figure 9:
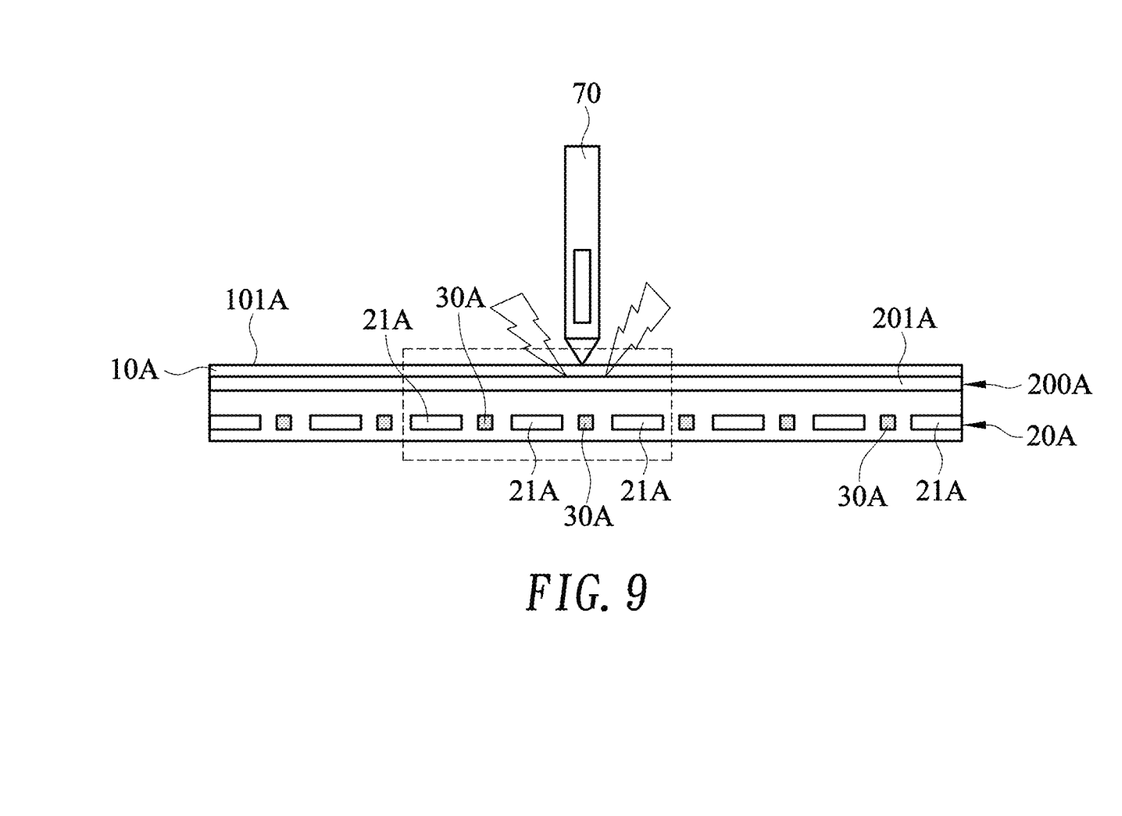
FIG. 9 is an operational illustrative side view of the touch device in FIG. 3, showing the stylus contacting the touch device.

With reference to FIGS. 8 and 9, when the object 70 contacts the touch operation area 101A, the control unit 50A can connect the only two charging traces 30A closest to the object 70 (the $3^{rd}$ and $4^{th}$ charging traces 30A from the left in the figure) to form a charging loop to charge the object 70. Since the object 70 is now closest to the charging traces 30A, which has an optimum charging efficiency, so that one charging loop is sufficient to charge the object 70. Comparing to select all of the charging traces 30A to form the multiple charging loops, the multiplexer 400A forms the charging loops only at a position closest to the object 70 through two of the charging traces 30A. In the practice of forming the single charging loop, the embodiment can not only achieve the charging efficiency of the object 70, but also save the power consumption of the touch device.

Figure 10:
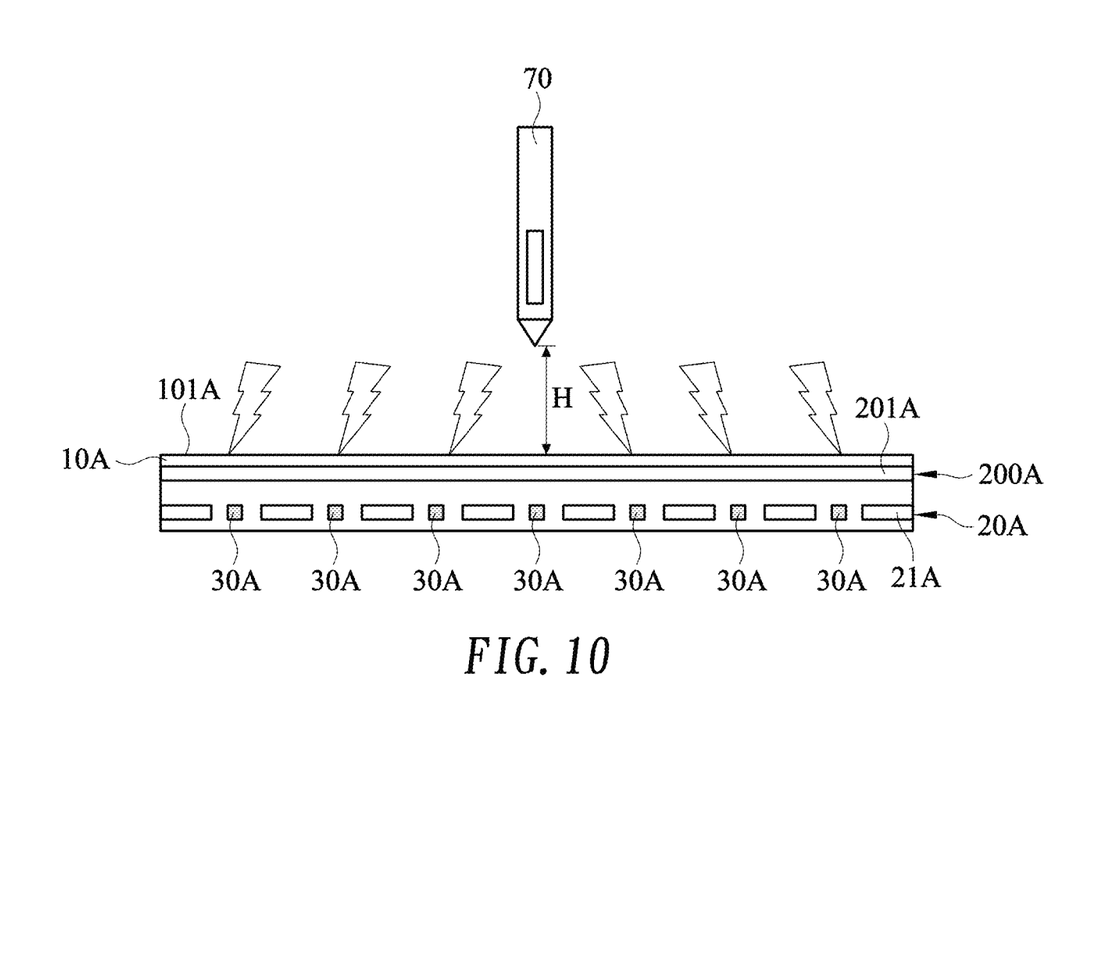
FIG. 10 is an operational illustrative side view of the touch device in FIG. 3, showing the stylus hovering over the touch device.

With reference to FIGS. 8 and 10, when the object 70 hovers over the touch operation area 101A with a distance H, the control unit 50A connects all the charging traces 30A to form multiple charging loops to charge the object 70. Since the object 70 is distant from the charging traces 30A, the charging loops are inferior in charging efficiency with respect to the object 70. Therefore, the multiple charging loops are configured to ensure that the touch device can maintain a better charging efficiency for the object 70.

The control unit 50A determines the distance between the object 70 and the touch operation area 101A through the sensing value sensed by the first sensor layer 20A and the second sensor layer 200A. The control unit 50A can also adjust the number of charging loops according to the distance between the object 70 and the touch operation area 101A. For example, when the distance is larger than a first distance, a first number of charging traces 30A are electrically connected. When the distance is larger than a second distance, a second number of charging traces 30A are electrically connected. The second distance is larger than the first distance, and the second number is larger than the first number.

Further, when the control unit 50A electrically connects the charging traces 30A, it may be selected to electrically connect the adjacent or non-adjacent charging traces 30A. The charging traces 30A are electrically connected to each other to form the charging loop, and are not limited to being adjacent to each other to constitute the charging loop. For example, the control unit 50A can electrically connect the $3^{rd}$ and $5^{th}$ charging traces 30A to form a charging loop, and can electrically connect the $4^{th}$ and $6^{th}$ charging traces 30A to form another charging loop. As long as the directions of the induced currents are the same direction when passing through the object, multiple co-directional charging loops can be formed.

Moreover, when the object 70 is located between the $3^{rd}$ and $4^{th}$ charging traces 30A, the control unit 50A electrically connects the $1^{st}$ and $6^{th}$ charging traces 30A to form a first charging loop, electrically connects the $2^{nd}$ and $5^{th}$ charging traces 30A to form a second charging loop, and electrically connects the $3^{rd}$ and $4^{th}$ charging traces 30A to form a third charging loop. For the object 70, it has multiple sets of co-directional charging loops to charge it, and can have better charging efficiency.

On the other hand, when an object is located between the $1^{st}$ and $2^{nd}$ charging traces 30A and another object is located between the $5^{th}$ and $6^{th}$ charging traces 30A, the control unit 50A electrically connects the $1^{st}$ and $2^{nd}$ charging traces 30A to form a first charging loop, and electrically connects $5^{th}$ and $6^{th}$ charging traces 30A to form a second charging loop. Then, the first and second charging loops respectively inductively charge the two objects, and may have better charging efficiency.

Figure 11:
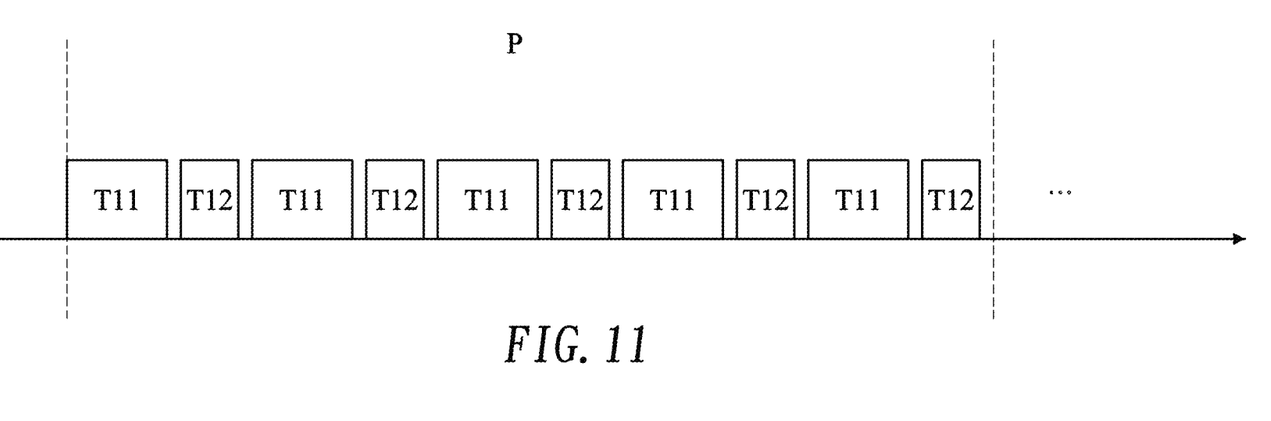
FIG. 11 is a time phase diagram for the charging control method executed on the touch device of FIG. 4.

With reference to FIGS. 11 and 4, the touch device as described performs touch sensing through the first sensor layer 20A and the second sensor layer 200A during the first working period T11, and inductively charges through the charging trace 30A during the second working period T12. In a frame P, the first working period T11 and the second working period T12 are alternately performed in time division.

Figure 12:
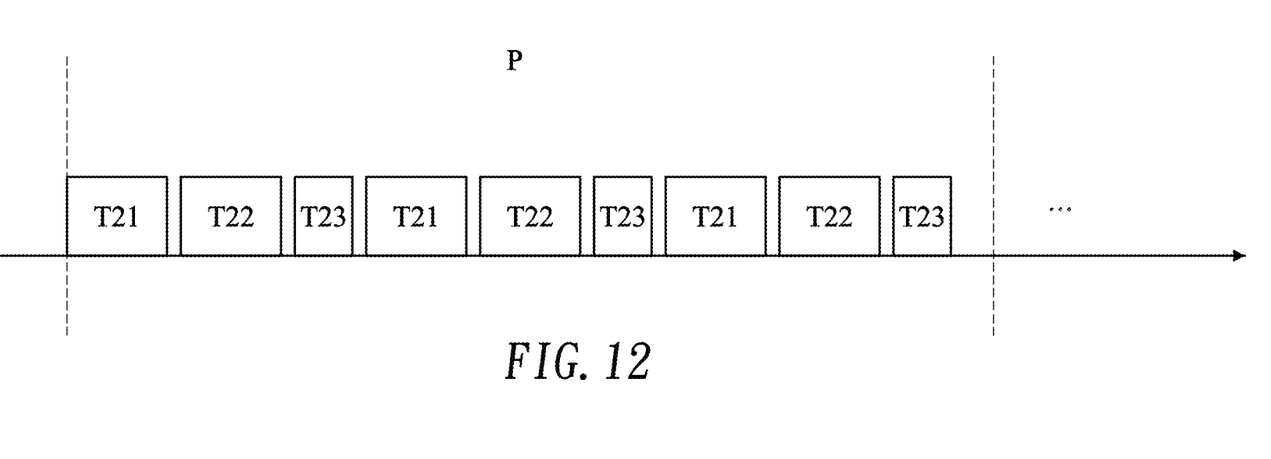
FIG. 12 is a time phase diagram for the charging control method executed on the touch device of FIG. 6.

With reference to FIGS. 12 and 6, the touch device performs image display through the display unit during the first working period T21, performs touch sensing through the first sensor layer 20A and the second sensor layer 200A during the second working period T22, and inductively charges through the charging trace 30A during the third working period T23. In a frame P, the first working period T21, the second working period T22 and the third working period T23 are alternately performed in time division.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touch device with a charging function comprising:
    a touch operation area;
    a first sensor layer having multiple first electrode units correspondingly arranged under the touch operation area for capacitance sensing to detect a position of an object hovering over or contacting the touch operation area;
    multiple gaps defined respectively between the first electrode units and each one of the gaps defined between adjacent two of the first electrode units;
    multiple charging traces correspondingly arranged to the touch operation area aligning with one of the gaps and disposed in a different layer relative to the first sensor layer;
    a multiplex unit connecting to the charging traces; and
    a control unit electrically connecting to the multiplex unit and electrically connecting to the first electrode units;
    wherein when the first sensor layer detects that the object hovers over or contacts the touch operation area, the multiplex unit electrically connecting several of the charging traces adjacent to the object based on the position of the object to form at least one charging loop for charging the object operating on the touch operation area.

2. The touch device as claimed in claim 1 further comprising a display unit, wherein the first sensor layer is constituted by a common electrode layer of the display unit.

3. The touch device as claimed in claim 1 further comprising a second sensor layer, wherein
    the second sensor layer has multiple second electrode units correspondingly arranged under the touch operation area and is arranged in a different layer relative to the first sensor layer;
    the first electrode units are driving electrode units;

the second electrode units are sensing electrode units and are insulated from and arranged in different directions to the first electrode units.

4. The touch device as claimed in claim 3, wherein the charging traces and the second sensor layer are disposed in the same layer.

5. The touch device as claimed in claim 4, wherein
the second electrode units are arranged in multiple rows; and
each charging trace is disposed between adjacent rows of the second electrodes.

6. The touch device as claimed in claim 5, wherein a width of each charging trace is smaller than a width of each second electrode unit.

7. The touch device as claimed in claim 4, wherein the charging traces, the first sensor layer and the second sensor layer are disposed respectively in different layers, and an arrangement between the charging traces and the first sensor layer or the second sensor layer does not completely overlap each other.

8. The touch device as claimed in claim 3 further comprising a display unit, wherein the second sensor layer is constituted by a common electrode layer of the display unit.

9. A charging control method for a touch device with a charging function, wherein the touch device comprises a touch operation area, a first sensor layer, multiple charging traces and a control unit, the first sensor layer and the charging traces are correspondingly arranged under the touch operation area, the control unit connecting to the charging traces and the first sensor layer, the first sensor layer having multiple first electrode units correspondingly arranged under the touch operation area, multiple gaps defined respectively between the first electrode units, each one of the gaps defined between adjacent two of the first electrode units, the charging traces located in or aligning with one of the gaps and disposed in different layers relative to the first sensor layer, and the charging control method comprises steps of:

obtaining a touch sensing information of an object hovering over or contacting the touch operation area by performing the capacitive sensing via the first electrode units of the first sensor layer;

determining the position of the object by the control unit based on the touch sensing information; and forming at least one charging loop by connecting several of the charging traces adjacent to the object according to the position of the object for charging the object operating on the touch operation area.

10. The charging control method as claimed in claim 9 further comprising steps of determining a distance between the object and the touch operation area based on the touch information when the control unit determines the position of the object based on the touch information, wherein in the step of forming at least one charging loop, a number of the at least one charging loop is determined by the distance; when the distance is larger, the number of the at least one charging loop is larger; when the distance is smaller, the number of the at least one charging loop is less.

11. The charging control method as claimed in claim 10, wherein when the distance is larger than a first distance, the number of the at least one charging loop is a first number.

12. The charging control method as claimed in claim 11, wherein when the distance is larger than a second distance, the number of the at least one charging loop is a second number;

the second distance is larger than the first distance; and the second number is larger than the first number.

13. The charging control method as claimed in claim 9, wherein in the step of forming at least one charging loop, each two of the charging traces are connected to form one of the at least one charging loop.

* * * * *